No. 628,590. Patented July 11, 1899.
W. E. SHAW.
HORSESHOE.
(Application filed Apr. 11, 1898.)
(No Model.)
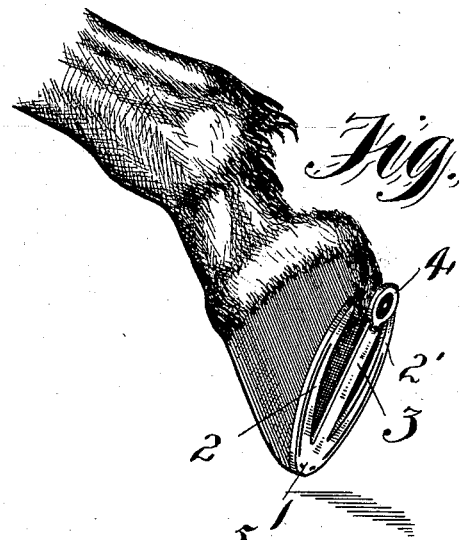
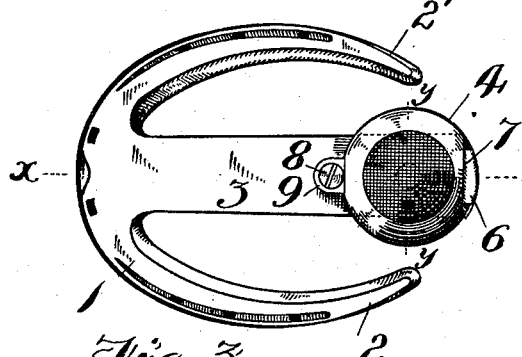
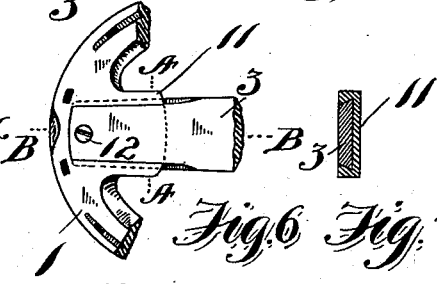
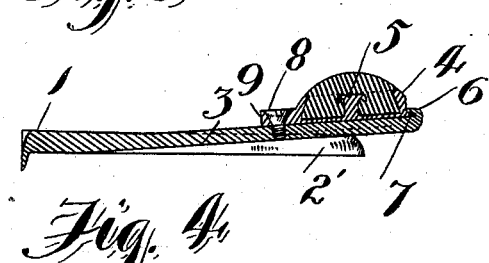
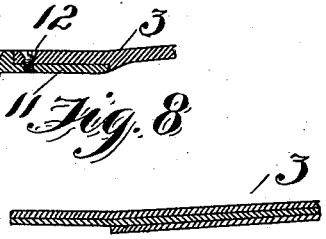
Witnesses
E. Phillips
Stewart Merrill
Inventor
William E. Shaw,
By his Attorneys
Kincaid & Co.

UNITED STATES PATENT OFFICE.

WILLIAM ENOS SHAW, OF SAN FRANCISCO, CALIFORNIA.

HORSESHOE.

SPECIFICATION forming part of Letters Patent No. 628,590, dated July 11, 1899.

Application filed April 11, 1898. Serial No. 677,195. (No model.)

*To all whom it may concern:*

Be it known that I, WILLIAM ENOS SHAW, a citizen of the United States, residing at San Francisco, in the county of San Francisco and State of California, have invented certain new and useful Improvements in Horseshoes; and I do hereby declare the following to be a full, clear, and exact description of the invention, such as will enable others skilled in the art to which it appertains to make and use the same.

Realizing the impediment and injury to the animal resulting from the use of the ordinary non-yielding metal horseshoe it has been the aim of a multitude of recent inventions to provide means for softening the tread of the horse at the same time preserving to a certain extent the durability of the shoe, and to this class of devices my present invention relates.

The advantage of providing some sort of foot-gear for the animals, and especially a yielding one, is of no late appreciation, for we find in history reference to Vespasian's muleteer shoeing his mules with wrappings of plaited fiber, such as hemp or sparitum, and in Japan clogs of twisted straw were used, while our modern plan of the firm metal shoes would no doubt appear a barbarous custom in their minds. The first mention of the metal-nailed shoes is in the works of Emperor Leo, ninth century, from which time this custom has been recognized as the only practical one suitable to cope with firm, hard, built-up pavements. It is a well-known fact to veterinary surgeons and those intelligently familiar with horses that the majority of cases of founder, laminitis, thrush, corns, canker, contraction, ossification of the cartilages, and navicular diseases can be directly attributed to the shoe.

With the above knowledge as an animating inspiration I have made my present invention, among whose objects is to provide a simple, durable, compact, comparatively inexpensive, and light shoe, by the use of which the speed and general action of the horse are benefited, while slipping and shock from concussion are obviated. In this yielding property of the shoe, rendering, as it does, a resilience to the tread and action of the animal, is the remedy for the above diseases and ailments, as it reaches the seat of the trouble by removing the cause.

A further object of my invention is to produce such a pressure on the frog of the shod horse as would naturally be felt were the horse's hoof in its free, unconfined, natural state, but which cannot be obtained with an ordinarily-shod hoof on account of the elevation of the frog above the ground. This so-called "frog," which is a triangular median prominence, notched posteriorly and situated in the hinder part of the sole of the hoof, is of extreme importance in considering the after effects of shoeing, and with this experience I have formed my shoe to meet such requirements. By the use of my shoe the weight-bearing structure of the hoof—namely, the wall and the frog—is brought into action, while the non-weight-bearing structure (the sole) is relieved from all unnecessary pressure, the latter being left bare and subjected to the beneficial action of the atmosphere and moisture of the earth without increasing the suction incident to travel on soft damp roads.

My invention comprehends another object, and that lies in the fact that when the horse is concentrating his energy in holding back the peculiar structure of the parts acts in the nature of a lock as the weight of the animal brings the shoe down against the ground. This property of affording a heel-and-toe hold is particularly valuable where the roads are of a hilly nature and a secure foothold an important item.

In aiming at the above results I have not overlooked the matter of structural simplicity and economy, and in the following specification advantages other than those above set forth may appear to those familiar with this class of devices.

I have clearly illustrated my invention in the accompanying drawings, in which—

Figure 1 is a view of a horse's leg with my shoe positioned on the hoof. The hoof is shown resting flat on the ground. Fig. 2 is a similar view with the foot raised. Fig. 3 is a top view of the shoe. Fig. 4 is a section through the line X X, Fig. 3. Fig. 5 is a section through line Y Y. Fig. 6 is a view of a modification. Fig. 7 is a section on line A A, Fig. 6. Fig. 8 is a section on line B B. Fig. 9 is a modification.

Referring now to the above views by numerals, 1 represents the main portion of the shoe, the toe, heel, quarters, clip, and fullering for nails being formed as in the ordinary metal shoe.

Leading backward from the toe of the shoe and equidistant from opposite legs or quarters 2 2' thereof is the central spring-web 3, which extends slightly beyond the heels of the shoe. By reference to Figs. 2 and 4 it will be seen that the plane of this web 3 is not coincident with the plane of the shoe proper, but intersects it in the neighborhood of the toe. It is further manifest that as the shod hoof strikes the ground the rear extremities of the web 3 will come in contact with the ground first, and its springy yielding nature will prevent any sudden concussion to the animal, but, on the contrary, let the hoof down gradually as the weight of the horse overcomes the spring in the web and causes it to occupy approximately the same plane as that of the shoe proper. It suffices merely to mention that in forcing this web down it comes in contact with the frog and produces the pressure above set forth as most desirable.

As a means for increasing the foothold of the shoe I have provided the cup-shaped metal member 4, into the cavity of which is molded under pressure a sufficient body of rubber to present a convex outer surface. To hold this rubber firmly within the cavity, I have formed the central shank 5, whose upper extremity spreads out, as shown. The manner of securing this member 4 to the outer extremity of the web 3 is shown in Figs. 4 and 5. It consists in causing the opposite edges of the web to diverge as they advance from the toe, while the dovetailed groove in the under surface of the member 4 engages with this wedge-shaped web. The outer extremity of the web is bent upward and backward to form the lip 6, which enters a corresponding cavity 7 in the member 4. By means of the screw 8, which passes through the lug 9 and into the web 3, the member 4 is securely held in place, while by pinching down the lip 6 further firmness is insured. It is evident that when the member 4 becomes worn the screw 8 can be removed and the member replaced by a new one. These members 4 can be employed on the heels and toes of ordinary shoes with but the exercise of mere mechanical skill in their adjustment.

In order to enable the web 3 to be readily attached to and detached from the shoe proper for purposes of replacing in case of accidental breaking, I have provided the construction shown in Fig. 6, which consists in forcing the tapered end of the web into a dovetailed groove in the inwardly-reaching projection 11, formed integral with the toe of the shoe. The screw 12 prevents accidental withdrawal of the web.

In Fig. 9 I have shown the web built up of a plurality of leaves similar to an ordinary wagon-spring.

It is manifest that the use of my shoe relieves the foot with "low heels" and obviates the inclination of the pastern which fatigues the tendons.

In extreme cases of quarter-crack the entire heels and quarters of the shoe can be cut off and still the combined support from the toe and web be sufficient to enable the animal to gain a square firm foothold.

I have practically demonstrated by actual trial that by the use of my shoe animals previously suffering from contraction or knee sprung are absolutely cured, while the perceptible improvement in the beauty of gait of the horse is worthy of especial mention.

I am aware that various changes in the form of the web as well as the manner of leading it from the shoe can be made without departing from the spirit or sacrificing any of the advantages of my invention, and I therefore reserve the right to make such changes and alterations as fairly fall within its scope.

Having thus fully described my invention, what I claim, and desire to secure by Letters Patent, is—

1. A non-slipping member for horseshoes adapted for contact with the ground or pavement consisting of an outer metal shell having an inwardly-flaring mouth, an inner body of rubber molded within said shell, a headed pin within said shell and a cavity in the under side of said shell, substantially as set forth.

2. In combination with a horseshoe, a spring-web formed independent of said shoe, and a tapered dovetailed groove in said shoe adapted to receive one extremity of said web, for the purpose set forth.

3. A horseshoe provided with a central spring-web, and a non-slipping surface formed independent thereof, but secured to said web and adapted to come in direct contact with the ground, for the purpose set forth.

4. A horseshoe provided with an independently-formed central spring-web, a non-slipping surface removably secured to said web, said shoe being widened at its point of union with said web, for the purpose set forth.

In testimony whereof I affix my signature in presence of two witnesses.

WILLIAM ENOS SHAW.

Witnesses:
 D. B. RICHARDS,
 GEO. S. HOLMES.